(12) United States Patent
Tamaki et al.

(10) Patent No.: US 8,630,313 B2
(45) Date of Patent: Jan. 14, 2014

(54) SIGNAL MAPPING METHOD AND COMMUNICATION DEVICE

(75) Inventors: Satoshi Tamaki, Yokohama (JP); Mikio Kuwahara, Yokohama (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 13/141,308

(22) PCT Filed: Dec. 18, 2009

(86) PCT No.: PCT/JP2009/071130
§ 371 (c)(1),
(2), (4) Date: Jun. 21, 2011

(87) PCT Pub. No.: WO2010/073987
PCT Pub. Date: Jul. 1, 2010

(65) Prior Publication Data
US 2011/0255519 A1     Oct. 20, 2011

(30) Foreign Application Priority Data
Dec. 22, 2008 (JP) .................................. 2008-325929

(51) Int. Cl.
*H04B 3/10* (2006.01)
(52) U.S. Cl.
USPC ......................................... 370/491; 714/790
(58) Field of Classification Search
None
See application file for complete search history.

(56) References Cited

U.S. PATENT DOCUMENTS

| | | | | |
|---|---|---|---|---|
| 7,457,231 | B2 * | 11/2008 | Vijayan et al. | 370/208 |
| 7,715,358 | B2 * | 5/2010 | Li et al. | 370/344 |
| 7,917,102 | B2 * | 3/2011 | Kobayashi et al. | 455/102 |
| 8,315,660 | B2 * | 11/2012 | Budianu et al. | 455/522 |
| 8,411,732 | B2 * | 4/2013 | Sampath et al. | 375/232 |
| 2006/0203711 | A1 | 9/2006 | Oh et al. | |
| 2010/0020889 | A1 | 1/2010 | Tamaki et al. | |
| 2010/0027512 | A1 | 2/2010 | Kishiyama et al. | |
| 2010/0220808 | A1 | 9/2010 | Kishigami et al. | |

FOREIGN PATENT DOCUMENTS

| | | |
|---|---|---|
| JP | 2005-295200 A | 10/2005 |
| JP | 2008-160822 A | 7/2008 |
| JP | 2008-172377 A | 7/2008 |
| WO | WO 2007/138753 A1 | 12/2007 |

OTHER PUBLICATIONS

International Search Report with English translation dated Jan. 26, 2010 (five (5) pages).
Form PCT/ISA/237 dated Jan. 26, 2010 (three (3) pages).

(Continued)

*Primary Examiner* — Gregory Sefcheck
(74) *Attorney, Agent, or Firm* — Crowell & Moring LLP

(57) ABSTRACT

Ameliorate deterioration in quality of communication caused by intercell interference with respect to a multicarrier communications protocol, such as OFDM. A method of positioning an error correction-coded signal is changed with a data symbol that is transmitted simultaneously with a pilot signal and a data symbol that is not simultaneous with the pilot symbol. Else, a modulation protocol is changed with a data symbol that is transmitted simultaneously with a pilot signal and a data symbol that is not simultaneous with the pilot symbol. It would further be permissible to lower either a signal amplitude or a power level of a data symbol that is transmitted simultaneously with a pilot signal.

12 Claims, 15 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.3.0 (May 2008) (twenty (20) pages).

Abstract of JP 2008-533801 T filed Aug. 21, 2008. JP 2008-533801 T corresponds to document A2, above.

English Translation of the International Preliminary Report on Patentability with Written Opinion of the International Searching Authority for PCT/JP2009/071130 dated Jul. 5, 2011 (six (6) pages).

* cited by examiner

PRIOR ART

SIGNAL MAPPING METHOD AND COMMUNICATION DEVICE

TECHNICAL FIELD

The present invention relates to a signal mapping method for encoded information and a communication device for realizing the method in a multicarrier communication system such as a communication system that divides the encoded signal into plural communication resources for communication, and particularly to an orthogonal frequency division multiplexing system that divides the encoded signal into plural subcarriers for communication.

BACKGROUND ART

With a wider bandwidth of a radio communication, a multicarrier communication system in which transmit information is divided into plural frequency bandwidths which is hereinafter called "subcarriers" for communication has been used. Among the multicarrier communication systems, the orthogonal frequency division multiplexing (OFDM) system can realize a high frequency use efficiency with no need of a guard band between the respective adjacent subcarriers by using an orthogonality of signals while improving a resistance to a delay wave by narrowing the bandwidth per subcarrier. The OFDM is employed in wide systems, for example, a worldwide interoperability of microwave access (WiMAX) and a long tern evolution (LTE).

In those communication systems, signals of a fixed pattern, which are hereinafter called "pilot signals", are inserted into a transmit signal at a transmitter side, and fluctuations of an amplitude and a phase during signal propagation are estimated from an amplitude and a phase of the pilot signals to demodulate a receive signal at a receiver side. A channel estimation is conducted with higher precision as a rate of the pilot signals inserted into the transmit signal is higher, and a communication quality can be enhanced. On the other hand, a rate of data signals is more increased as an insertion ratio of the pilot signals is lower, and a maximum data rate is improved. Therefore, the number of pilot signals to be mapped is reduced as much as possible within the required precision of channel estimation.

FIG. 2 is a diagram illustrating an example of a pilot signal mapping of the LTE system. FIG. 2 illustrates an example disclosed in "3GPP TS 36.211 V8.3.0 Evolved Universal Terrestrial Radio Access (E-UTRA); Physical Channels and Modulation (Release 8)" (Non Patent Literature 1), which shows a pilot signal mapping when one antenna port is used. In this literature, signals called "reference signals" correspond to pilot signals. FIG. 2 is a schematic diagram in which the axis of abscissa represents an OFDM symbol number, that is, a time axis, and the axis of ordinate represents a subcarrier number, that is, a frequency axis. Each rectangular box represents one modulation symbol such as QPSK or 16QAM. Among those rectangular boxes, gray rectangles of symbols 202 represent the pilot signals, and white rectangles of symbols 201 represent signals such as data signals and control signals except for the pilots. In this example, two pilot signals are mapped per one slot in a time direction, and one pilot is mapped per 6 subcarriers in a frequency direction. In the LTE, positions where the pilot signals are mapped in the time direction are different depending on the number of antennas, but common in all of the cells. On the other hand, the pilot signals are mapped in the frequency direction at different positions depending on the cells. In an example illustrated in FIG. 2, the pilot signals are mapped in a subcarrier n, a subcarrier n+3, a subcarrier n+6, and a subcarrier n+9. However, in another cell, for example, the pilot signals are mapped in a subcarrier n+1, a subcarrier n+4, a subcarrier n+7, and a subcarrier n+10.

FIG. 3 is a diagram illustrating another example of the pilot signal mapping of the LTE system.

FIG. 3 illustrates one example of the pilot signal mapping disclosed in Non Patent Literature 1 like FIG. 2, and is a schematic diagram illustrating the pilot signal mapping in one antenna port when four antenna ports are used. The gray rectangles of the symbols 202 represent the pilot signals, and the white rectangles of the symbols 201 represent non-pilot signals are as in FIG. 2. X-mark rectangles of symbols 203 represent times and frequencies which are not used for signal transmission for the purpose of avoiding collision with the pilot signals of other antenna ports.

In demodulating the respective non-pilot signals, there is used channel information obtained by subjecting times and frequencies, at which the appropriate non-pilot signals are mapped, to interpolation and extrapolation on the basis of channel estimation results using the pilot signals. As illustrated in the schematic diagrams of FIGS. 2 and 3, the pilot signals are smaller in number than the non-pilot signals. Therefore, a disturbance added to one symbol of the pilot signal affects a receive quality of a large number of peripheral non-pilot signals using the channel estimation results of the subject pilot signal. For that reason, a higher receive quality of the pilot signal is required than that of the non-pilot signals. For that reason, for example, Patent literature 1 introduces a technique in which, in order to increase transmission powers of the pilot signals while keeping the total transmission power per hour constant, the transmission powers of the non-pilot signals are averagely lowered, or some of the symbols allocated for transmission of the non-pilot signals are not used for transmission.

Patent Literature 1: JP-A-2008-172377 (Transmission device, receiving device, and method used in a mobile communication system using an OFDM system)

Non Patent Literature 1: 3$^{rd}$ Generation Partnership Project; Technical Specification Group Radio Access Network; Evolved Universal Terrestrial Radio Access (E-UTRA); Physical Channels and Modulation (Release 8), 3GPP TS 36.211 V8.3.0, May of 2008, 6. 10 Reference Signals

DISCLOSURE OF INVENTION

Problem that Invention is to Solve

FIG. 4 is a diagram illustrating an example of a relationship between base stations and terminals in a multi-cell environment.

In the multi-cell environment where there are plural base stations, there is a case in which there occurs an inter-cell interference that a communication signal in one cell obstructs a communication signal of another cell. For example, a transmission signal from a base station A 101 to a terminal A 111 also arrives at a terminal B 112 with attenuation corresponding to a distance therebetween. For that reason, when a signal is transmitted from a base station B 102 to the terminal B 102 at the same time, the signal arriving from the base station A 101 interferes with the signal from the base station B 102 to deteriorate a communication quality.

In order to reduce an influence of the interference between the cells, there is, for example, a method in which the cells are placed at a distance for conducting communication by using the same frequency so as to sufficiently attenuate the interference signal without using the same frequency in the adjacent cells. However, there arises such a problem that the use efficiency of the frequency is deteriorated although an inter-cell interference is more reduced as the distance between the cells using the same frequency is larger. For that reason, in order to enhance the use efficiency of the frequencies, there is a need to provide a system in which the communication quality is not largely deteriorated even under a circumstance where there is a certain level of inter-cell interference.

Also, for example, in the technique disclosed in the above Patent Literature 1, an attempt is made to improve a signal-to-interference power ratio of a pilot power by making the transmission power of the pilot signal larger than the transmission powers of other symbols. However, there arises such a problem that the quality of the symbol that undergoes the interference from the pilot signal having the larger power is largely deteriorated, taking the inter-cell interference into consideration. Further, in the technique disclosed in Patent Literature 1, a power ratio of the pilot signal and the non-pilot signal, or information indicating that the symbol for any non-pilot signal is not used for transmission needs to be shared between a transmitter station and a receiver station in advance. For that reason, there arises such problems that stations using the technique disclosed in Patent Literature 1 and stations not using the technique are mixed together, and it is difficult to switch between use and non-use of the technique.

The present invention has been made to solve the above problems, and aims at providing a signal mapping method and a communication device for reducing the deterioration of a communication quality caused by an influence of the inter-cell interference occurring under a multi-cell environment.

Means For Solving Problem

As means for solving the above problem, in the signal mapping method and the communication device that realizes the method according to the present invention, a mapping of an error correction encoded signal is changed by a data symbol simultaneously transmitted with a pilot signal, and a data symbol not simultaneously transmitted with the pilot signal. Alternatively, in a power allocation method and a communication device that realizes the method, a modulation system is changed by the data symbol simultaneously transmitted with the pilot signal, and the data symbol not simultaneously transmitted with the pilot signal.

According to the first solving means of the present invention, there is provided a signal mapping method for mapping data signals and pilot signals having a known pattern in each symbol determined by a subcarrier number and a symbol number, or in each symbol determined by a frequency axis and a time axis, in a multicarrier communication system that communicates an encoded signal by using a plurality of sub-carriers, the signal mapping method comprising steps of:
subjecting a transmit signal of N0 bits to error correction encoding to generate a signal of N1 bits; and
when signals that can be mapped in a plurality of first data symbols not simultaneously transmitted with the pilot symbols are M0 bits, and signals that can be mapped in a plurality of second data symbols simultaneously transmitted with the pilot symbols are M1 bits, (i) in a case of $N0 \leq M0 < N1$,
extracting M0 bits minimumly required for decoding the transmit signal of N0 bits before the error correction encoding, from the signals N1 bits after the error correction encoding to configure punctured codes of an encoding ratio N0/M0, mapping the punctured codes in the plurality of first data symbols, and also mapping a part or all of bits of the signals that are not mapped in the plurality of first data symbols among the signals after the error correction encoding, in the plurality of second data symbols, (ii) in a case of $M0 > N1$,
mapping all of the signals Ni bits after the error correction encoding in the plurality of first data symbols, (iii) in a case of $M0 < N0 \leq M0 + M1$,
configuring the codes of the encoding ratio N0/(M0+M1) from the signals N1 bits after the error correction encoding, and mapping the codes in the plurality of first data symbols and the plurality of second data symbols.

According to the second solving means of the present invention, there is provided a signal mapping method for mapping data signals and pilot signals having a known pattern in each symbol determined by a subcarrier number and a symbol number, or in each symbol determined by a frequency axis and a time axis, in a multicarrier communication system that communicates an encoded signal by using a plurality of subcarriers, the communication device comprising:
a symbol modulation block that modulates a signal allocated to the each symbol,
wherein the symbol modulation block makes a maximum number of transmission bits transmittable per one symbol of a modulation system used in a data symbol simultaneously transmitted with the pilot signals be smaller than a maximum number of transmission bits transmittable per one symbol of the modulation system used in the data symbol not simultaneously transmitted with the pilot symbols.

According to the third solving means of the present invention, there is provided a signal mapping method for mapping data signals and pilot signals having a known pattern in each symbol determined by a subcarrier number and a symbol number, or in each symbol determined by a frequency axis and a time axis, in a multicarrier communication system that communicates an encoded signal by using a plurality of sub-carriers, the signal mapping method comprising steps of:
using a modulation system having information in an amplitude direction and a phase direction in data symbols not simultaneously transmitted with the pilot signals, and
using a modulation system having information only in the phase direction without information in the amplitude direction in the data symbols simultaneously transmitted with the pilot signals so that a large peak power does not occur for each symbol.

According to the fourth solving means of the present invention, there is provided a communication device for mapping data signals and pilot signals having a known pattern in each symbol determined by a subcarrier number and a symbol number, or in each symbol determined by a frequency axis and a time axis, in a multicarrier communication system that communicates an encoded signal by using a plurality of sub-carriers, the communication device comprising:
an error correction encoding block that subjects a transmit signal of N0 bits to error correction encoding to generate a signal of N1 bits; and
a multiplexing and mapping block that multiplexes and maps the signals N1 bits after the error correction encoding from the error correction encoding block and the pilot signals on each symbol,
wherein when signals that can be mapped in a plurality of first data symbols not simultaneously transmitted with the pilot symbols are M0 bits, and signals that can be mapped in a plurality of second data symbols simultaneously transmitted with the pilot symbols are M1 bits, the multiplexing and mapping block (i) in a case of N0≤M0<N1, extracts M0 bits minimumly required for decoding the transmit signal of N0 bits before the error correction encoding, from the signals N1 bits after the error correction encoding to configure punctured codes of an encoding ratio N0/M0, maps the punctured codes in the plurality of first data symbols, and also maps a part or all of bits of the signals that are not mapped in the plurality of first data symbols among the signals after the error correction encoding, in the plurality of second data symbols, (ii) in a case of M0>N1, maps all of the signals N1 bits after the error correction encoding in the plurality of first data symbols, (iii) in a case of M0<N0≤M0+M1, configures the codes of the encoding ratio N0/(M0+M1) from the signals N1 bits after the error correction encoding, and maps the codes in the plurality of first data symbols and the plurality of second data symbols.

According to the fifth solving means of the present invention, there is provided a communication device for mapping data signals and pilot signals having a known pattern in each symbol represented by a matrix of subcarriers or frequencies and symbol numbers or a time axis, in a multicarrier communication system that communicates an encoded signal by using a plurality of subcarriers, the communication device comprising:

a symbol modulation block that modulates a signal allocated to the each symbol, wherein the symbol modulation block makes a maximum number of transmission bits transmittable per one symbol of a modulation system used in a data symbol simultaneously transmitted with the pilot signals be smaller than a maximum number of transmission bits transmittable per one symbol of the modulation system used in the data symbol not simultaneously transmitted with the pilot symbols.

According to the sixth solving means of the present invention, there is provided a communication device for mapping data signals and pilot signals having a known pattern in each symbol determined by a subcarrier number and a symbol number, or in each symbol determined by a frequency axis and a time axis, in a multicarrier communication system that communicates an encoded signal by using a plurality of subcarriers, the communication device comprising:

a symbol modulation block that modulates a signal allocated to the each symbol, wherein the symbol modulation block uses a modulation system having information in an amplitude direction and a phase direction in data symbols not simultaneously transmitted with the pilot signals, and uses a modulation system having information only in the phase direction without information in the amplitude direction in the data symbols simultaneously transmitted with the pilot signals so that a large peak power does not occur for each symbol.

Advantageous Effects Of Invention

According to the present invention, there are provided the signal mapping method and the communication device, which can reduce an influence of the deterioration of the communication quality even under an environment in which there are the inter-cell interference in a multicarrier communication system such as an OFDM.

BEST MODE FOR CARRYING OUT INVENTION

1. Application of the Present Invention

Figure 1:
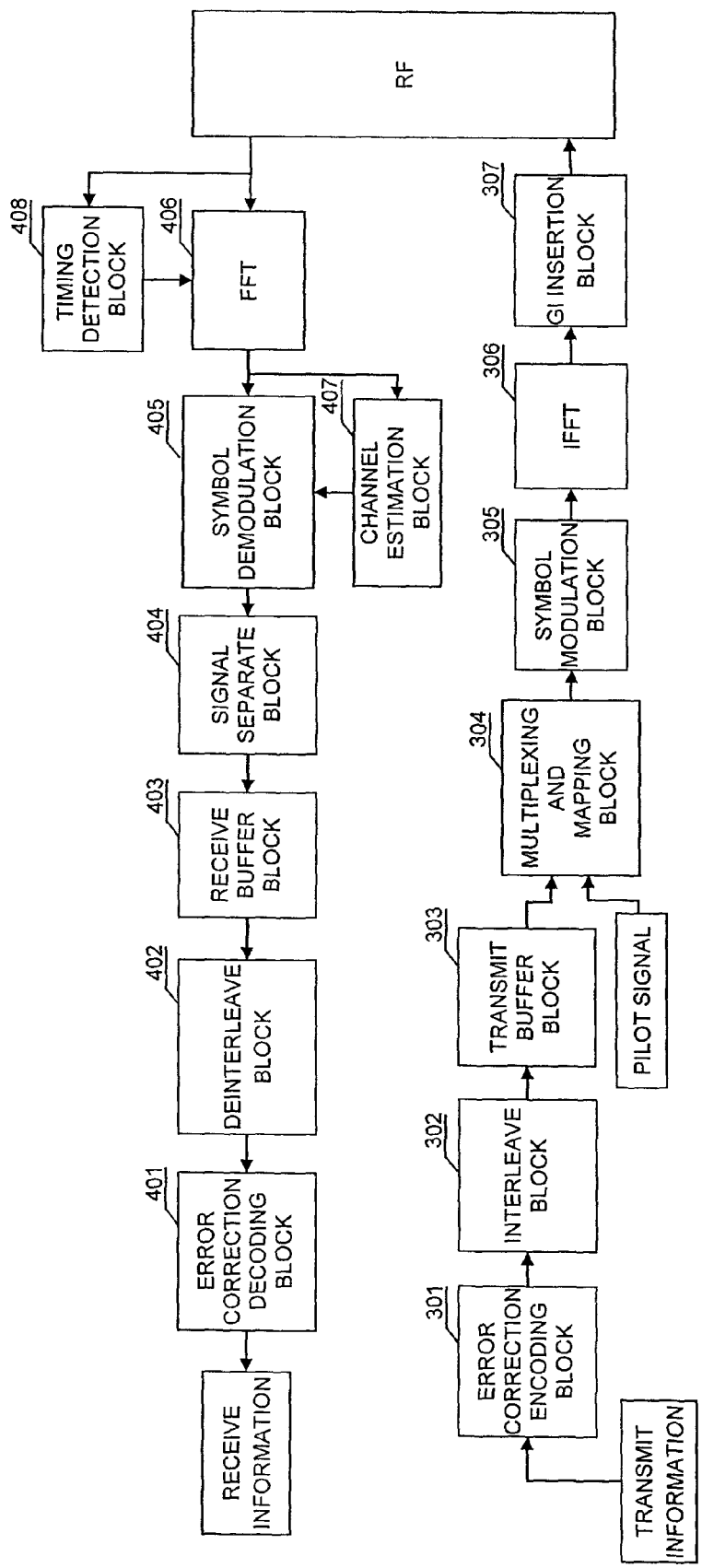
FIG. 1 is a diagram illustrating one example of a block diagram representative of signal processing in a radio station according to the present invention.
Figure 2:
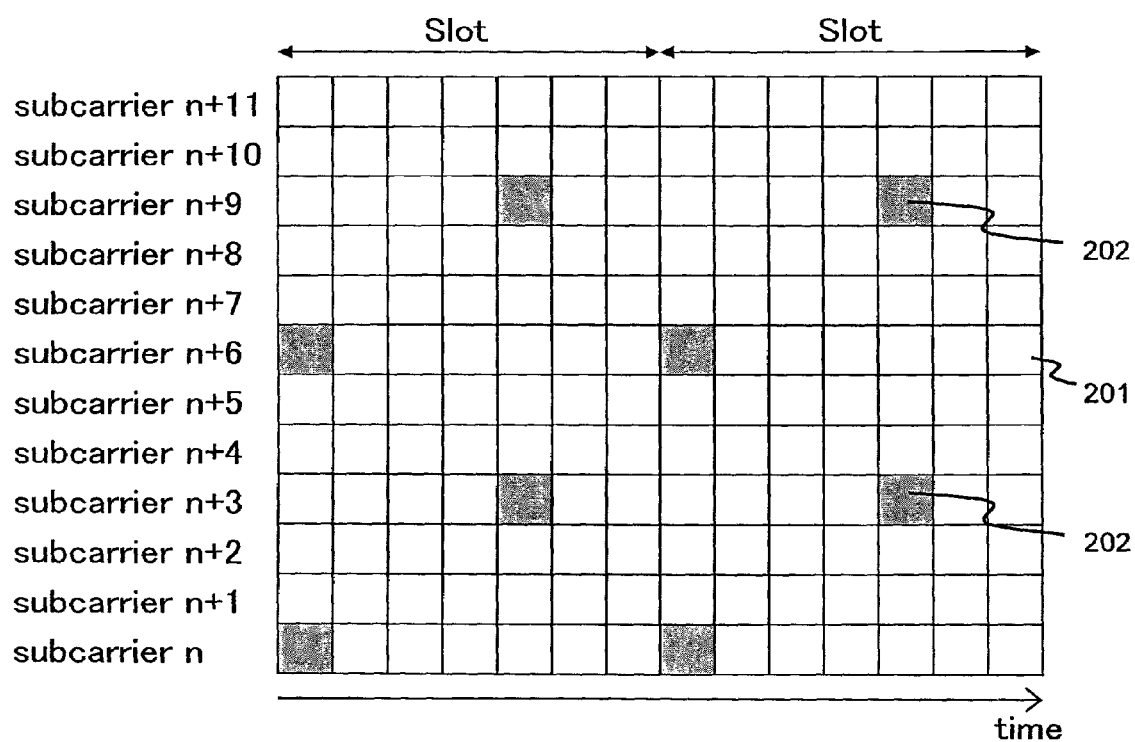
FIG. 2 is a diagram illustrating another example of a pilot signal mapping of an LTE system.
Figure 3:
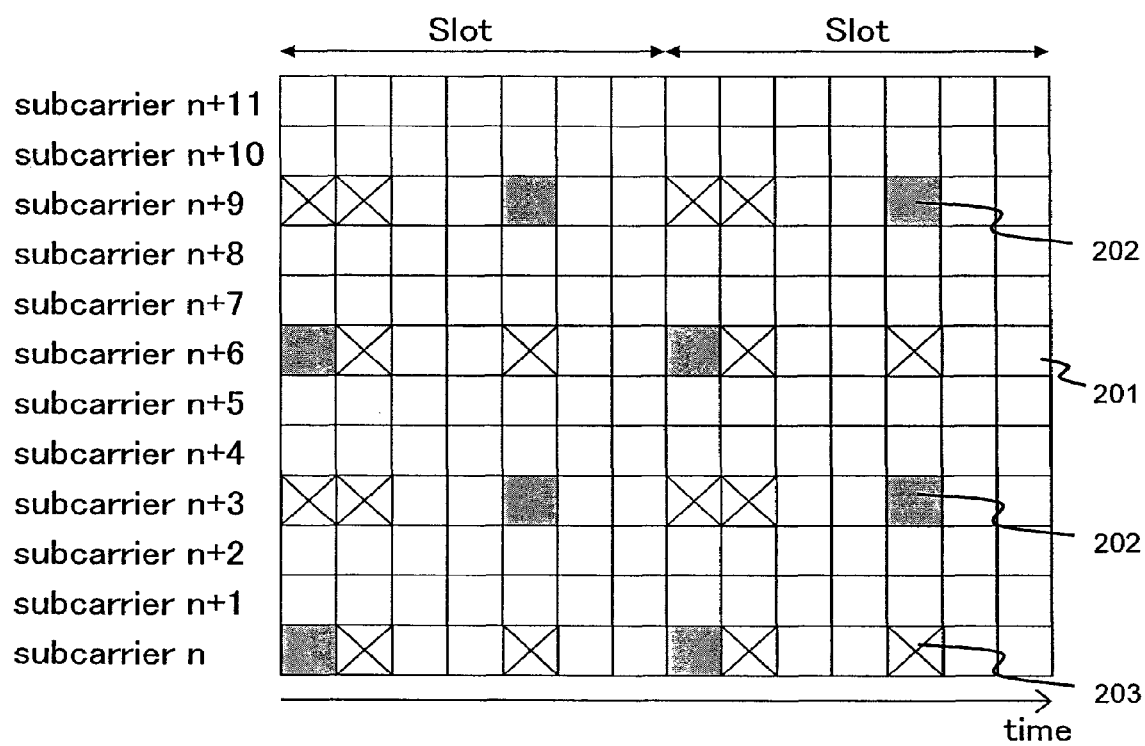
FIG. 3 is a diagram illustrating another example of the pilot signal mapping of the LTE system.
Figure 4:
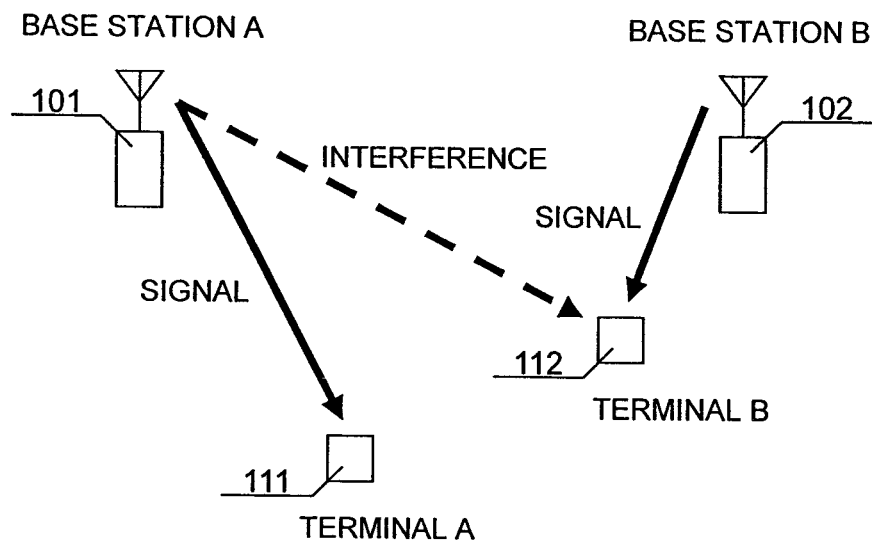
FIG. 4 is a diagram illustrating an example of a relationship between a base station and a terminal in a multi-cell environment.

Hereinafter, various embodiments of the present invention will be described with reference to the drawings. In the following description, for simplification, a description will be given of a case in which a signal mapping method and a communication device according to the present invention are applied to a signal that is transmitted from a first radio station to a second radio station. The first radio station is called "transmitter station", and the second radio station is called "receiver station". On the other hand, the signal mapping method and the communication device according to the present invention can be applied to both of signal transmission from the first radio station to the second radio station, and signal transmission from the second radio station to the first radio station. In this case, each of the first and second radio stations conducts signal processing of both of the transmitter station and the receiver station which will be described below. The communication device according to the present invention can include the transmitter station, the receiver station, or both of the transmitter station and the receiver station.

For example, in a system in which there exist a base station or an access point hereinafter called "fixed station" and a user terminal hereinafter called "mobile station" in a cellular system or a radio LAN of an infrastructure mode, when the present invention is applied to a communication from the fixed station to the mobile station, the fixed station corresponds to the transmitter station, and the mobile station corresponds to the receiver station. Conversely, when the present invention is applied to a communication from the mobile station to the fixed station, the mobile station corresponds to the transmitter station, and the fixed station corresponds to the receiver station. Also, when the present invention is applied to both communications from the fixed station to the mobile station, and from the mobile station to the fixed station, each of the fixed station and the mobile station conducts both signal processing as the transmitter station and the receiver station.

Also, in a system in which the respective terminals communicate directly with each other such as a radio LAN of an ad hoc mode, when a signal produced by application of the present invention is transmitted, each of the terminals operates as the transmitter station, and when the signal produced by application of the present invention is received, each of the terminals operates as the receiver station.

Also, hereinafter, the embodiments of the present invention will be described with reference to an OFDM system in which respective subcarriers have frequencies orthogonal to each other on a symbol basis, as a multicarrier communication system. However, the present invention is not limited to the OFDM system, but can be applied to any multicarrier systems using the plural subcarriers.

Also, the following description will be made with reference to drawings in which the number of subcarriers is limited to, for example, 12. However, the present invention can be also applied to systems having any number of subcarriers with no limitations on the number of subcarriers.

Also, in the following description, data referred to as "data symbol" and "transmission data" may include only user data such as speech traffic or image or video traffic, or may include a control signal in addition to the user data.

Also, in the following description, a pilot symbol means a signal having a fixed pattern used for estimation of phase and amplitude fluctuation in a channel. For example, in Non Patent Literature 1, a signal referred to as "reference signal" corresponds to the pilot signal.

Also, as a pilot symbol mapping method, an appropriate method can be employed. Although not particularly disclosed, in the mapping method according to the present invention, any mappings of the pilot symbols can be employed in which there are a data symbol simultaneously transmitted with the pilot symbol and a data symbol not simultaneously transmitted with the pilot symbol. For example, the mapping method may be identical to that of the downlink reference signal disclosed in Non Patent Document 1.

Also, in the present invention, a likelihood means a value estimated from a receive signal. The likelihood means a logarithmic value of a ratio of a probability that the transmit signal is estimated to be 0 and a probability that the transmit signal is estimated to be 1, or an approximate value thereof. The likelihood also refers to a value called "log likelihood ratio".

2. First Embodiment 2-1. Signal Mapping

Hereinafter, a first embodiment of the present invention will be described with reference to the drawings.

Figure 5:
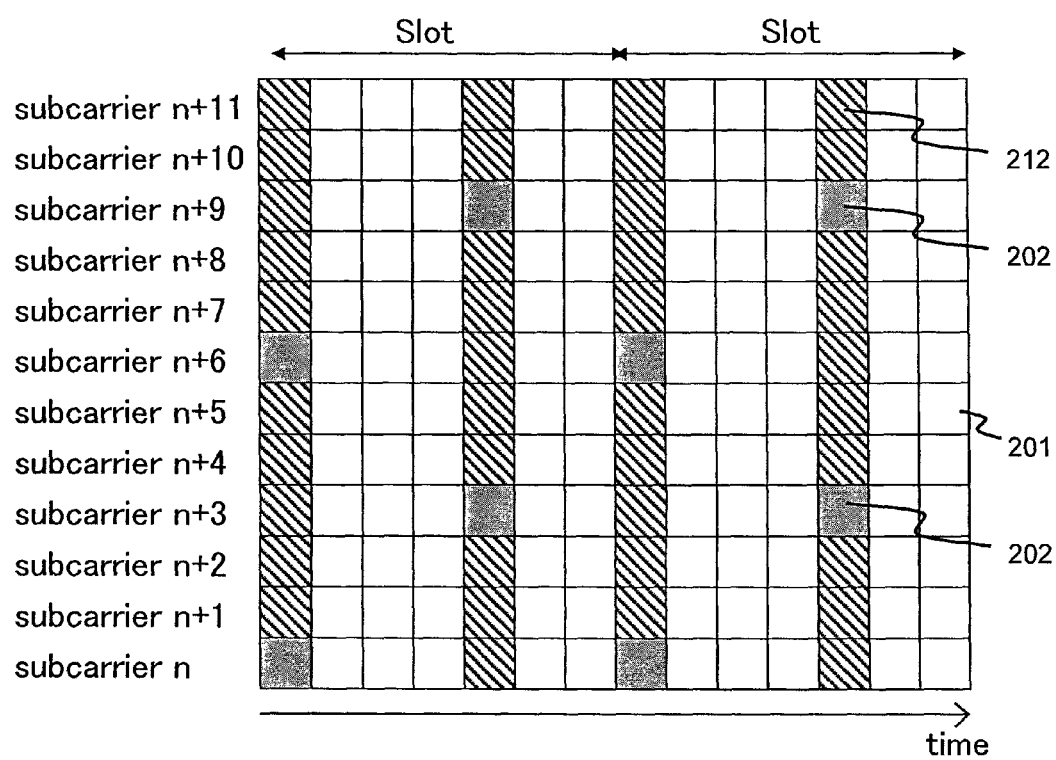
FIG. 5 illustrates an example of a schematic diagram of a signal mapping according to an embodiment of the present invention.

FIG. 5 illustrates an example of a schematic diagram of a signal mapping according to an embodiment of the present invention. The axis of ordinate represents a subcarrier, that is, frequency, the axis of abscissa represents an OFDM symbol, that is, a time, and an individual rectangle represents one modulation symbol. Respective gray rectangles 202 represent pilot symbols, hatched rectangles represent data symbols 212 simultaneously transmitted with the pilot symbols, and white rectangles represent other data symbols 201 not simultaneously transmitted with the pilot symbols.

In the signal mapping according to the present invention, the signals are selected and mapped so that minimum signals required for decoding the receive signal are mapped in the data symbols 201 not simultaneously transmitted with the pilot symbols with the highest priority, and punctured codes are configured by only signals mapped in the data symbols 201 not simultaneously transmitted with the pilot symbols.

Hereinafter, it is assumed that the signals that can be mapped in the data symbols 201 not simultaneously transmitted with the pilot symbols are M0 bits, the signals that can be mapped in the data symbols 212 simultaneously transmitted with the pilot symbols are M1 bits, the transmit signals before error correction encoding are N0 bits, and the signals after the error correction encoding are N1 bits. For example, the data mapping is conducted with two slots as one unit by the aid of a QPSK that can communicate two bits per one symbol as a modulation system of each symbol in the symbol mapping of FIG. 5. In this case, because the number of data symbols 201 not simultaneously transmitted with the pilot symbols is 120, M0=240 is satisfied. Likewise, because the number of data symbols 212 simultaneously transmitted with the pilot symbols is 40, M1=80 is satisfied.

Figure 14:
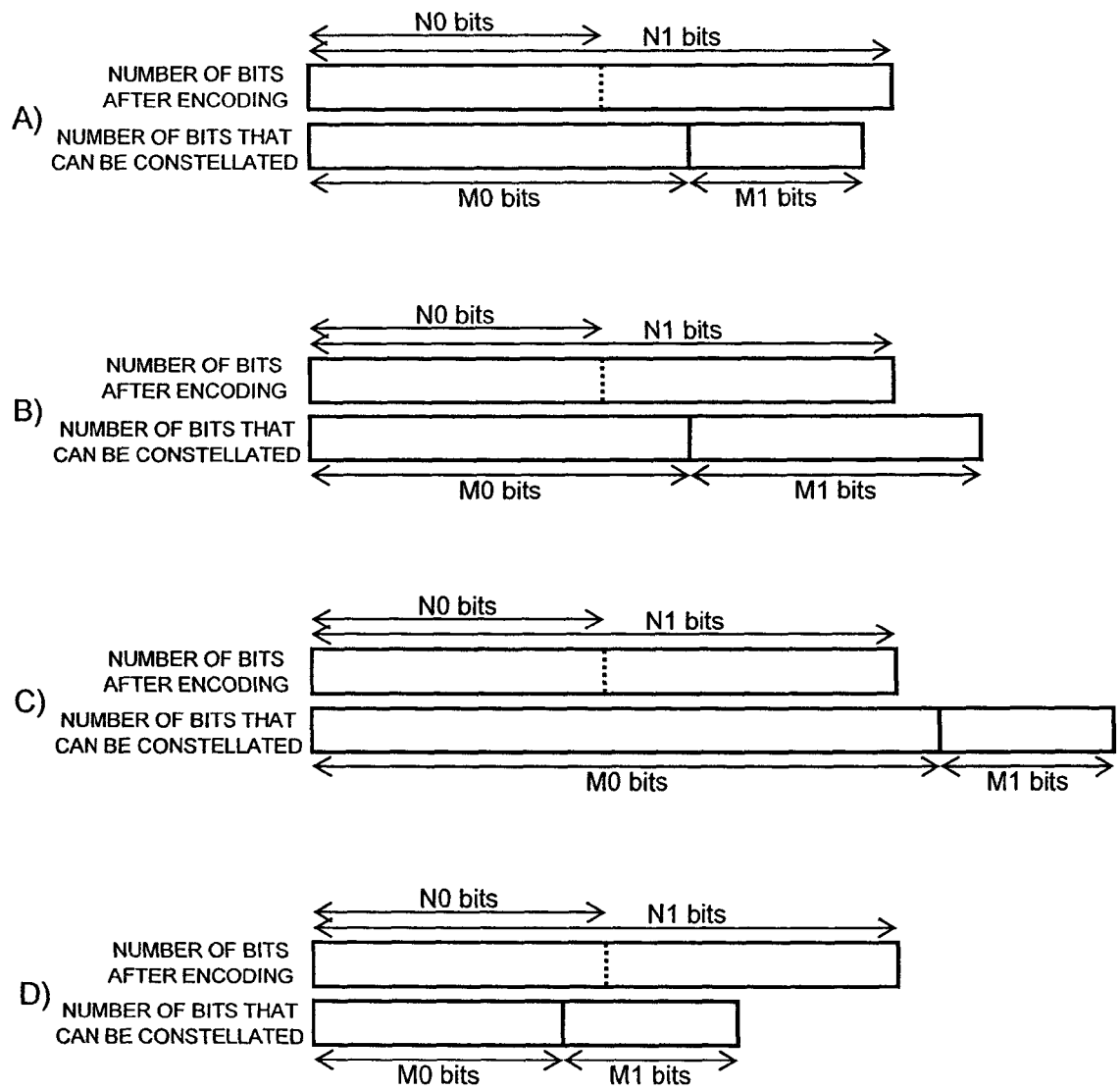
FIG. 14 is a diagram illustrating an example of a diagram representative of a conditional branch of a signal mapping according to the embodiment of the present invention.

FIG. 14 is a diagram illustrating an example of a diagram representative of a conditional branch of a signal mapping according to the embodiment of the present invention.

The signal mapping is conducted according to a relationship of values of M0, M1, N0, and N1 as follows.

A) A case of N0≤M0≤N1 and M0+M1≤N1:

M0 bits are extracted from the signals N1 bits after the error correction encoding to configure the punctured codes of the encoding ratio N0/M0, and the punctured codes are mapped in the data symbols 201 not simultaneously transmitted with the pilot symbols. Further, M1 bits are extracted from the signals that are not mapped in the data symbols 201 not simultaneously transmitted with the pilot symbols among the signals after the error correction encoding, and mapped in the data symbols 212 simultaneously transmitted with the pilot symbols. The signals that are not mapped in M0 and M1 among the signals N1 bits after the error correction encoding may be discarded as they are, or may be preferentially selected as information used for retransmission when retransmission control such as a hybrid ARQ is conducted.

B) A case of N0≤M0≤N1 and M0+M1>N1:

M0 bits are extracted from the signals N1 bits after the error correction encoding to configure the punctured codes of the encoding ratio N0/M0, and the punctured codes are mapped in the data symbols 201 not simultaneously transmitted with the pilot symbols. Further, all of the signals that are not mapped in the data symbols 201 not simultaneously transmitted with the pilot symbols among the signals after the error correction encoding are mapped in the data symbols 212 simultaneously transmitted with the pilot symbols. Further, signals for M0+M1−N1 bits are selected from the signals already mapped in any data symbols through an appropriate technique, and mapped in the data symbols 212 simultaneously transmitted with the pilot symbols.

C) A case of M0>N1:

All of the signals N1 bits after the error correction encoding are mapped in the data symbols 201 not simultaneously transmitted with the pilot symbols. Further, signals for M0−N1 bits are selected from the signals already mapped in the data symbols and mapped in the data symbols 201 not simultaneously transmitted with the pilot symbols, and the signals for M1 bits are selected through an appropriate technique and mapped in the data symbols 212 simultaneously transmitted with the pilot symbols.

D) A case of M0<N0≤M0+M1:

The codes of the encoding ratio N0/(M0+M1) are configured from the signals N1 bits after the error correction encoding, and mapped in the data symbols 212 simultaneously transmitted with the pilot symbols and the pilot symbols 202 not simultaneously transmitted with the pilot symbols.

E) A case of M0+M1<N0:

In this state, data cannot be received in transmission of one unit, and data can be received by collecting plural times of transmission data under retransmission control. In this case, when data can be received in transmission of x units, the number of bits that can be mapped in the data symbols 201 not simultaneously transmitted with the pilot symbols for the x units are treated together as M0, the number of bits that can be mapped in the data symbols 212 simultaneously transmitted with the pilot symbols for the x units are treated together as M1. This is applied to any case of the above A), B), C), and D). For example, when data mapping of two units (x=2) is conducted with two slots as one unit, in an example of FIG. 5, the data symbols 201 satisfies M0=480, the data symbols 212 satisfies N1=160, on the basis of which this is applied to any case of the above A) , B) , C) , and D) to mappedata.

As the configuration method of the punctured codes used in the mapping of data described above, simply, for example, there is a method of preferentially allocating systematic bits when systematic codes are used as the error correction codes, to the data symbols 201 not simultaneously transmitted with the pilot symbols.

Figure 7:
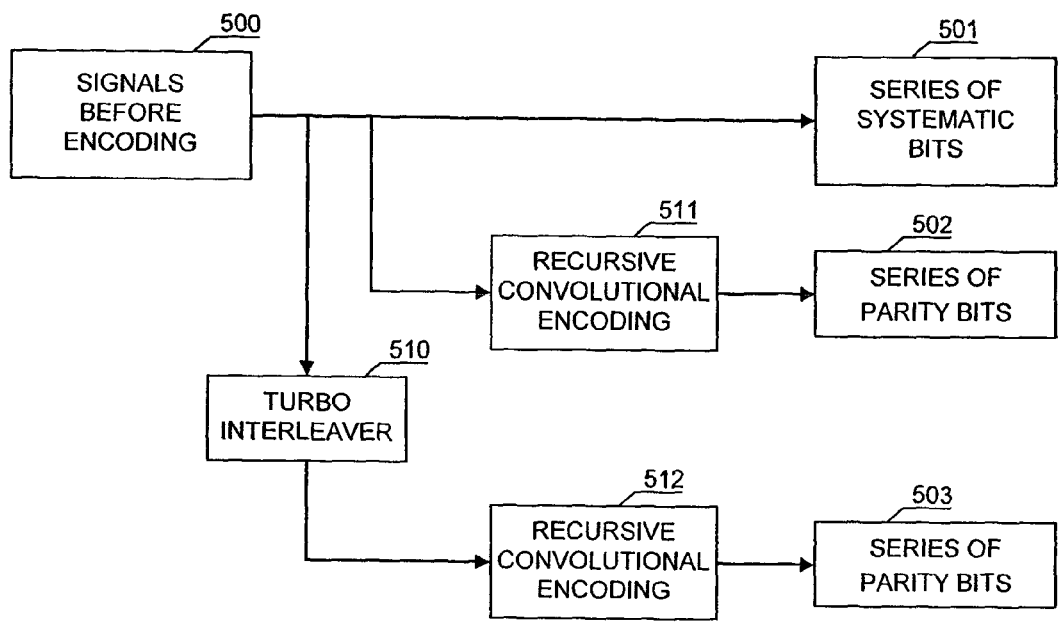
FIG. 7 is a diagram illustrating an example of a turbo encoder which is an example of an error correction encoder.

FIG. 7 is a schematic diagram illustrating an encoding block of turbo codes which are one of the systematic codes used in a radio communication. In the turbo encoder, signals before encoding 500 are output directly as series of systematic bits 501, and also output as series of parity bits 502 that have been subjected to recursive convolutional encoding through a recursive convolutional encoding block 511, and as series of parity signals 503 that have been subjected to recursive convolutional encoding through a recursive convolutional encoding block 512, after order is converted in a turbo interleaver 510.

When the present invention is applied to the signals encoded by the turbo encoder of FIG. 7, after the series of systematic bits 501 are preferentially mapped in the data symbols 201 not simultaneously transmitted with the pilot symbols, the series of parity bits 502 and 503 may be mapped in the data symbols 201 not simultaneously transmitted with the pilot symbols and the data symbols 212 simultaneously transmitted with the pilot symbols.

In this example, the systematic codes exemplify the turbo codes. However, the same method is applicable even to systematic codes different from the turbo codes, such as LDPC codes. Also, a method of configuring the punctured codes different from the above method may be used if decodable punctured codes can be configured. Also, there is no need to use the systematic codes as the error correction codes.

According to the above signal mapping, data can be decoded without using the data symbols 212 simultaneously transmitted with the pilot symbols whose quality is deteriorated by interference derived from the pilot signals of another cell. Therefore, the communication quality can be prevented from being deteriorated even in an environment where intercell interference exists.

Figure 15:
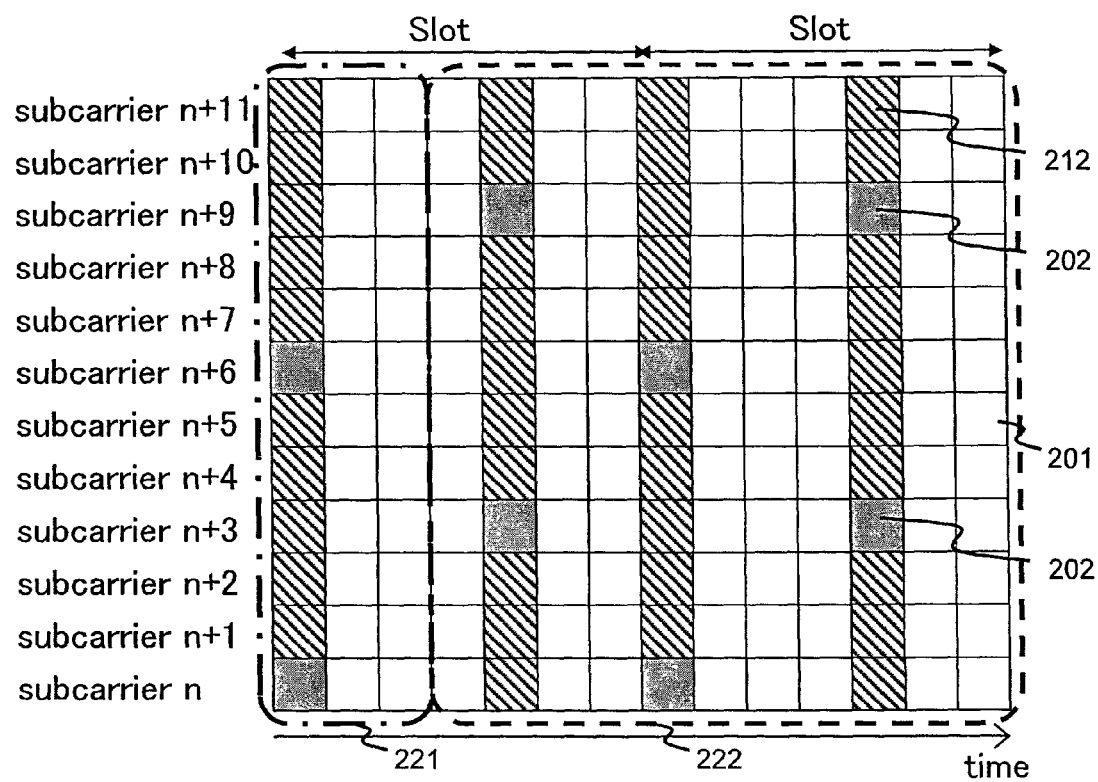
FIG. 15 illustrates still another example of the schematic diagram of the signal mapping according to the embodiment of the present invention.

FIG. 15 illustrates another example of a schematic diagram of the signal mapping according to the embodiment of the present invention. The axis of ordinate represents a subcarrier, that is, frequency, the axis of abscissa represents an OFDM symbol, that is, a time, and an individual rectangle represents one modulation symbol. Gray rectangles represent the pilot symbols 202, hatched rectangles represent the data symbols 212 simultaneously transmitted with the pilot symbols, and white rectangles represent the other data symbols 201 not simultaneously transmitted with the pilot symbols. Also, an area surrounded by a chain line represents a first channel range 221, which represents that the data symbols within the area surrounded by the chain line get together to configure one channel. Also, an area surrounded by a broken line represents a channel range 222 in the figure, which represents that the data symbols within the area surrounded by the broken line get together to configure another channel.

As the signal mapping illustrated in FIG. 15, when plural channels that each conduct error correction encoding are mapped within one unit that conducts the data mapping, the same signal mapping as the signal mapping of FIG. 5 may be conducted for each channel. Also, for example, the first channel range 221 may not conduct the same signal mapping as the signal mapping of FIG. 5, but may conduct the same signal mapping as the signal mapping of FIG. 5 only in the second channel range 222.

FIG. 15 illustrates an example of a case in which two channels are mapped within a unit that conducts the data mapping. The same is applied to a case in which three or more channels are mapped.

Figure 6:
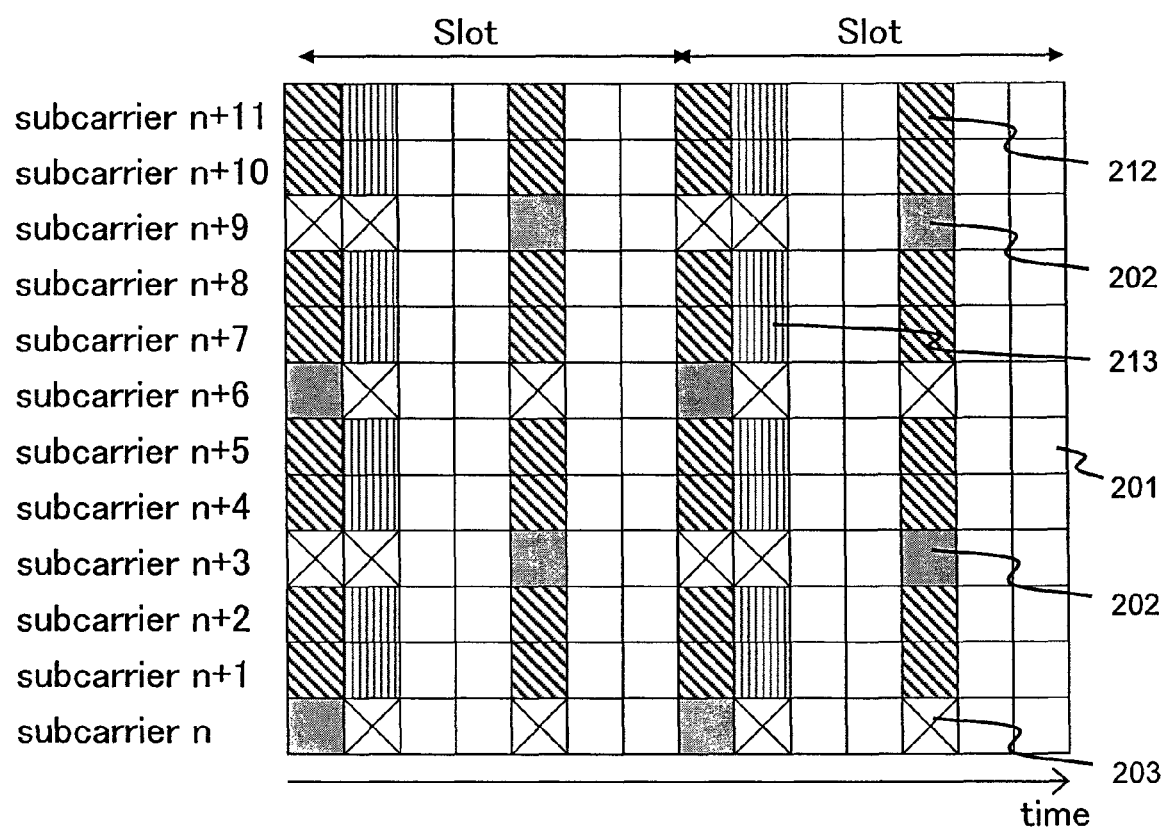
FIG. 6 illustrates another example of the schematic diagram of the signal mapping according to the embodiment of the present invention.

FIG. 6 illustrates another example of the schematic diagram of the signal mapping according to the embodiment of the present invention. The axis of ordinate represents a subcarrier, that is, frequency, the axis of abscissa represents an OFDM symbol, that is, a time, and an individual rectangle represents one modulation symbol. Gray rectangles represent the pilot symbols 202, hatched rectangles represent the data symbols 212 simultaneously transmitted with the pilot symbols, and white rectangles represent the other data symbols 201 not simultaneously transmitted with the pilot symbols. Also, rectangles marked with x represent no transmission symbols 203 that do not transmit the signals by transmitting the pilot signals by another antenna. Vertically-striped rectangles represent data symbols 213 simultaneously transmitted with the no transmission symbols.

In the signal mapping of FIG. 6, a signal mapping method for the data symbols 212 simultaneously transmitted with the pilot symbols and the data symbols 201 not simultaneously transmitted with the pilot symbols is the same as that in the signal mapping of FIG. 5. The data symbols 213 simultaneously transmitted with no transmission symbols maybe treated as the data symbols 212 simultaneously transmitted with the above pilot symbols, or may be treated as the data symbols 201 not simultaneously transmitted with the pilot symbols.

2-2. Communication Device

Hereinafter, a description will be given of a configuration of a communication device (transmitter station and receiver station) according to the present invention will be described with reference to the drawings.

FIG. 1 is a block diagram representative of signal processing in the communication device (radio station) according to the present invention.

An error correction encoding block 301 subjects transmit information input by the aid of an error correction code such as a turbo code, a convolutional code, a Reed-Solomon code, or an LDPC code to error correction encoding, and outputs the encoded information to an interleave block 302. The error correction encoding block 301 may add the error detection code such as a CRC to the transmit information before the error correction encoding. Also, the error correction encoding block 301 may conduct a random process on a signal using, for example, a PN code before or after the error correction encoding.

The interleave block 302 conducts an interleave process for replacement of a signal order on an input signal, and outputs the signal to a transmit buffer block 303. The transmit buffer block 303 accumulates input signals, and outputs the signals to a multiplexing and mapping block 304 according to the amount of information transmitted every unit time.

In the processes from the error correction encoding block 301 to the transmit buffer block 303, for example, when signals of a control signal channel and one or more data signal channels are generated or signals for plural users are generated, plural blocks can be provided in parallel for conducting the processes, or one or the plural blocks can be repetitively used by time multiplexing.

The multiplexing and mapping block 304 maps the signals in the data symbols, and also maps the pilot signals in the pilot symbols. The multiplexing and mapping block 304 maps the input signals and pilot signals in correspondence with the subcarriers and the symbol times for transmission, for plural channels if plural channels are used for communication, and for plural users if communication is conducted for the plural users, and conduct output.

When the radio station of FIG. 1 is a transmitter station, the multiplexing and mapping block 304 conducts mapping so as to conduct the signal mapping according to the above rule at the output time of the multiplexing and mapping block 304. In the above rule, the subcarriers where signals are mapped and the symbol times need to be associated with the output of the error correction encoding block 301. Therefore, the mapping according to the above rule may be provided at any portion therebetween. That is, for example, the error correction encoding block 301 may conduct encoding by the aid of the systematic codes, the interleave block 302 may interleave the systematic bits and parity bits, individually, and the multiplexing and mapping block 304 may allocate those signals to the subcarriers and the symbol times according to the above rule. Also, for example, a mapping rule in the multiplexing and mapping block 304 may be fixed, and the interleave block 302 may conduct interleaving according to the above rule in advance in allocating the signals to the subcarriers and the symbol times according to the mapping rule.

A symbol modulation block 305 modulates the signals allocated to each subcarrier and each symbol time for each subcarrier and each symbol time through a symbol modulation system such as a BPSK, a QPSK, an 8PSK, or a 16QAM. An IFFT block 306 aligns the signals input from the symbol modulation block 305 on a frequency axis, and converts the input signals into time domain signals through IFFT computation for outputting.

Figure 8:
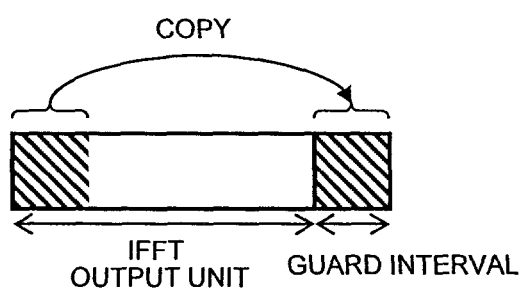
FIG. 8 is a schematic diagram illustrating a guard interval insertion process.

A GI insertion block 307 conducts a guard interval insertion process for copying a partial end of the time domain signal after IFFT computation for each IFFT signal processing unit to insert the copied one into a head thereof, as illustrated in a schematic diagram of FIG. 8. The GI insertion block 307 then converts the signal into a signal of a radio frequency bandwidth through an RF block for transmission.

A timing detection block 408 detects a receive signal timing by a receive signal converted into the baseband bandwidth through the RF block for outputting to an FFT block 406. As means for detecting a receive signal timing, for example, a cross-correlation value of the receive signal and the fixed pattern signal may be used, or an autocorrelation value of the receive signal per se apart by an IFFT unit may be used. The FFT block 406 cuts the signal of the time domain input from the RF block by the IFFT unit by the aid of a receive timing notified from the timing detection block 408, conducts an FFT process on the cut signals, and converts the signals into signals of a frequency domain for outputting.

A channel estimation block 407 compares a phase and an amplitude of each pilot signal included in the signal input from the FFT block 406 with a phase and an amplitude of each pilot signal that is the transmitted fixed pattern, estimates variations of the phase and the amplitude for each subcarrier and each time according to a comparison result, and notifies a symbol demodulation block 405 of an estimation result. The symbol demodulation block 405 compensates fluctuation of the signal input from the FFT block 406 in the channel by the aid of the estimated values of the phase and amplitude fluctuations notified from the channel estimation block 407, demodulates the symbol modulated signal such as the QPSK and the 16 QAM, and derives likelihood for each bit for outputting.

A signal separate block 404 extracts and separates the signal for each unit of the decoding process which is conducted, for example, for each user and each channel with respect to the likelihood for each bit derived by the symbol demodulation block 405. A receiver buffer block 403 holds an output of the signal separate block 404 for each unit of the decoding process. When the receiver buffer block 403 accumulates signals for a decoding process unit, the receiver buffer block 403 outputs the signals to a deinterleave block 402. The deinterleave block 402 conducts a deinterleave process which is an order conversion corresponding to the reverse conversion of the order conversion conducted in the interleave block 302 during transmission. An error correction decoding block 401 conducts a decoding process by the aid of the error correction code used in the error correction encoding block 301, and outputs the decoded signal as receive information. Also, when a random process is conducted before or after the error correction encoding in the error correction encoding block 301 during transmission, a reverse conversion process corresponding to the random process is conducted after or before the decoding process. Also, when the error detection code is added before the error correction encoding in the error correction encoding block 301, the error detection process is conducted after the decoding process, and the error detection result is added to the receive information, and output.

In the processes from the receiver buffer block 403 to the error correction decoding block 401, for example, when the signals of the control signal channel and one or more data signal channels are received, or the signals for plural users are received, plural blocks can be provided in parallel for conducting the processes, or one or the plural blocks can be repetitively used by time multiplexing.

Also, the above flow of signal processing is an example, and if the signal output from the RF block finally has the same form during transmission, and if the signal output from the error correction decoding block 401 has the same form during reception, the flow and order of the signal processing may be changed in any manner. For example, in the above example, the symbol modulation block 305 is disposed after the multiplexing and mapping block 204. Alternatively, the symbol modulation block 305 may be disposed immediately after the interleave block 302 so that symbol modulation may be conducted before the signals are accumulated in the transmit buffer block 303.

3. Second Embodiment

In the first embodiment, a method that focuses attention on only the signal mapping is described. The object of the present invention can be also achieved by changing the modulation method as another embodiment.

That is, in the signal mapping of FIG. 5, as compared with the modulation system used in the data symbols 201 not simultaneously transmitted with the pilot symbols, a modulation system used in the data symbols 212 simultaneously transmitted with the pilot symbols provides a system high in the error resistance, thereby making it possible to reduce the deterioration of the communication quality caused by interference from the pilot symbols of another cell.

In general, the error resistance is higher as the modulation system is smaller in the maximum number of transmittable bits per symbol for each modulation system. For that reason, for example, when 64QAM that can transmit information of 6 bits at the maximum per one symbol is used in the data symbols 201 not simultaneously transmitted with the pilot symbols, the object can be achieved by using the 16QAM that can transmit the information of 4 bits at the maximum per one symbol in the data symbols 212 simultaneously transmitted with the pilot symbols, or by using the QPSK that can transmit the information of 2 bits at the maximum per one symbol.

Also, the object can be achieved by using the modulation system such as the BPSK, the QPSK, or the 8PSK having information only in the phase direction without information in the amplitude direction in the data symbols 212 simultaneously transmitted with the pilot symbols so that a large peak power does not occur for each symbol, in order to reduce the interference with the pilot symbols of another cell.

Even when the signal mapping is illustrated in the schematic diagram of FIG. 6, as in the first embodiment, a method of selecting the modulation system for the data symbols 212 simultaneously transmitted with the pilot symbols and the data symbols 201 not simultaneously transmitted with the pilot symbols is the same as the selection of the modulation system in FIG. 5. The data symbols 213 simultaneously transmitted with no transmission symbol may be treated as the data symbols 212 simultaneously transmitted with the pilot symbols, or may be treated as the data symbols 201 not simultaneously transmitted with the pilot symbols.

Hereinafter, a configuration of the communication device (transmitter station and receiver station) according to this embodiment will be described with reference to a block diagram of FIG. 1. The operation of the respective blocks in the block diagram of FIG. 1 related to transmission and reception of the signal is basically identical to the operation described in the first embodiment.

When the communication device (radio station) of FIG. 1 is the transmitter station of the second embodiment, the symbol modulation block 305 selects the modulation system different between the data symbols 201 not simultaneously transmitted with the pilot symbols and the data symbols 212 simultaneously transmitted with the pilot symbols. For example, the symbol modulation block 305 selects the modulation system smaller in the maximum number of transmittable bits per one symbol, for the modulation system used in the data symbols 212 simultaneously transmitted with the pilot symbols, as compared with the modulation system used in the data symbols 201 not simultaneously transmitted with the pilot symbols. Alternatively, the symbol modulation block 305 selects, as a modulation system used in the data symbols 212 simultaneously transmitted with the pilot symbols, the modulation system such as the BPSK, the QPSK, or the 8PSK having no information in the amplitude system. The symbol modulation block 305 may select the modulation system for each channel or each target user, individually, in conducting the signal processing for the plural channels or the plural users.

The system described in this embodiment can be used, independently, and can be also implemented together with the method described in the first embodiment at the same time.

4. Third Embodiment

The methods described in the first embodiment and the second embodiment can further effectively achieve the object of the present invention by addition of control of the transmission power. That is, with application of one or both of the methods described in the first embodiment and the second embodiment, the transmission power per one symbol of the data symbols 212 simultaneously transmitted with the pilot symbols is made smaller than the transmission power per one symbol of the data symbols 201 not simultaneously transmitted with the pilot symbols, or the transmission power per symbol of the data symbols 212 simultaneously transmitted with the pilot symbols is set to 0, thereby enabling an influence of the inter-cell interference to be reduced.

In general, when the power of a partial transmission symbol is deteriorated, or set to 0, the quality in decoding the receive signal including the symbol is deteriorated. Therefore, in combination with the signal mapping described in the first embodiment, the deterioration of the decoding quality can be reduced. Also, the deterioration of the decoding quality can be reduced by reducing the number of bits per symbol in the modulation system used in the data symbols 212 simultaneously transmitted with the pilot symbols as described in the second embodiment.

Further, in general, when the power of a partial transmission symbol is deteriorated, or set to 0, there is a need to share information on how power of which symbol is changed between the transmitter station and the receiver station. Hence, with use of the modulation system having no information in the amplitude direction in the data symbols 212 simultaneously transmitted with the pilot symbols as in the second embodiment, the receiver station can demodulate the signal even without having information on whether the transmission power of the data symbols 212 simultaneously transmitted with the pilot symbols is decreased, or not, or how the transmission power of the data symbols 212 simultaneously transmitted with the pilot symbols is decreased, at the transmitter station. Therefore, the transmission power can be easily changed.

Even when the signal mapping is illustrated in the schematic diagram of FIG. 6, as in the first embodiment and the second embodiment, a method of determining the transmission power for the data symbols 212 simultaneously transmitted with the pilot symbols and the data symbols 201 not simultaneously transmitted with the pilot symbols is identical to the method of determining the transmission power of FIG. 5. The data symbols 213 simultaneously transmitted with the no transmission symbol may be treated as the data symbols 212 simultaneously transmitted with the pilot symbols, or may be treated as the data symbols 201 not simultaneously transmitted with the pilot symbols.

Hereinafter, a configuration of the communication device (transmitter station and receiver station) according to this embodiment will be described with reference to a block diagram of FIG. 1. The operation of the respective blocks in the block diagram of FIG. 1 related to transmission and reception of the signal is basically identical to the operation described in the first embodiment.

When the communication device (radio station) of FIG. 1 is the transmitter station of the third embodiment, the symbol modulation block 205 reduces the signal amplitude of the data symbols 212 simultaneously transmitted with the pilot symbols more than the signal amplitude of the data symbols 201 not simultaneously transmitted with the pilot symbols. Alternatively, the symbol modulation block 205 sets the signal amplitude of the data symbols 212 simultaneously transmitted with the pilot symbols to 0. The symbol modulation block 305 may select the signal amplitude for each channel or each target user, individually, in conducting the signal processing for the plural channels or the plural users.

When it is found in advance that the signal received in the receiver station is a signal transmitted by the transmitter station of the third embodiment, if the radio station of FIG. 1 is the receiver station, the likelihood obtained as the demodulation results of the data symbols 212 simultaneously transmitted with the pilot symbols may be reduced or set to 0 in the symbol demodulation block 305. As a process for reducing the likelihood obtained as the demodulation result, there is a method of multiplying the likelihood by a coefficient smaller than 1, for example, 0.5. As a process of setting the likelihood of the corresponding bits to 0, there is a method of multiplying the likelihood by 0, likewise.

5. Modified Example of Third Embodiment

The control of the above third embodiment not only is fixedly conducted, but also can be implemented by triggering the condition.

Figure 10:
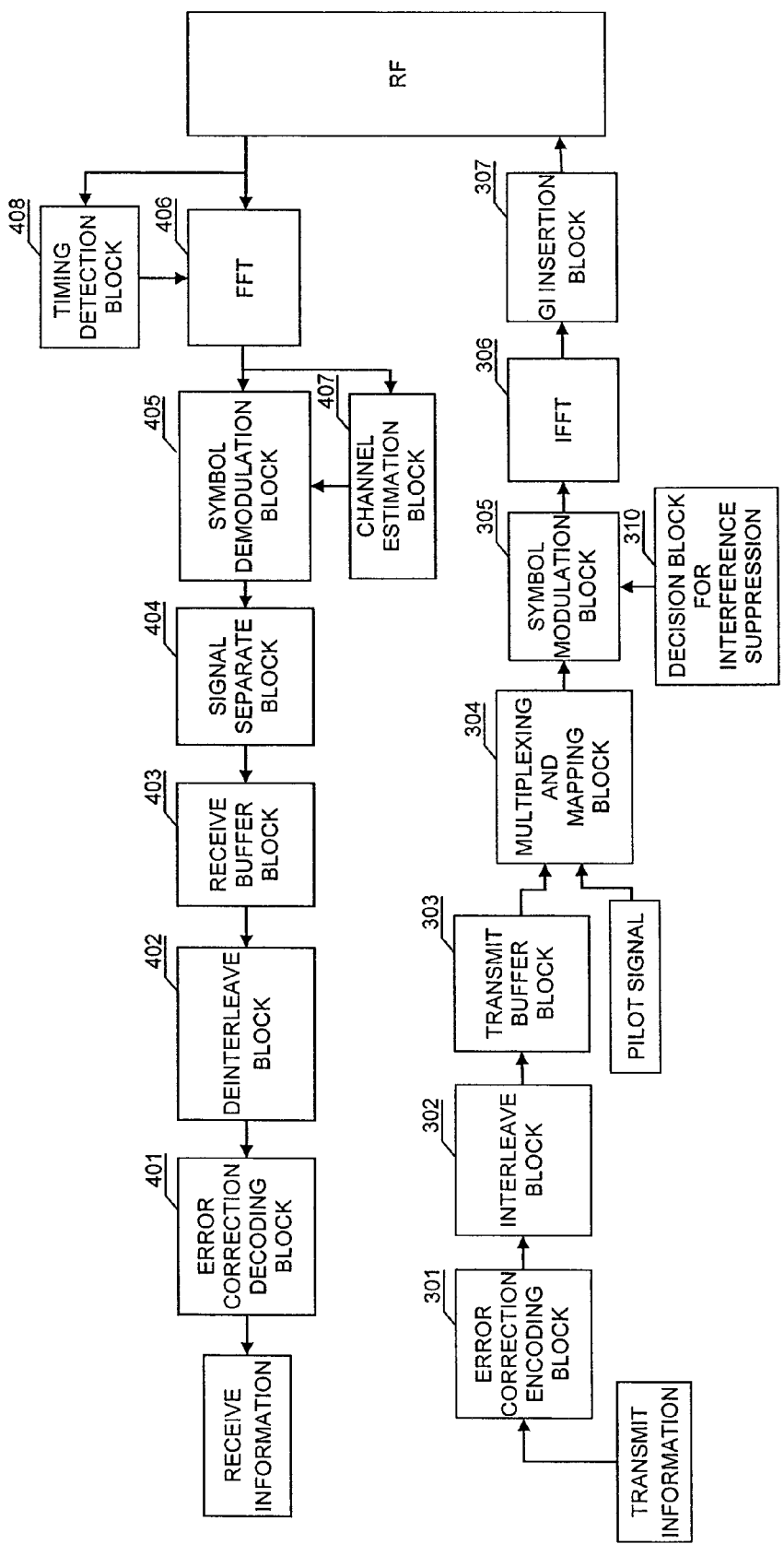
FIG. 10 is a diagram illustrating another example of the block diagram representative of the signal processing in the radio station according to the present invention.

FIG. 10 is another example of the block diagram representative of the signal processing in the radio station according to this embodiment. The block diagram of FIG. 10 is different from the block diagram of FIG. 1 in that a decision block for interference suppression 310 is added, and an input from the decision block for interference suppression to the symbol modulation block 305 is added. The respective blocks other than those two points conduct the operation as described in the above embodiments.

Figure 11:
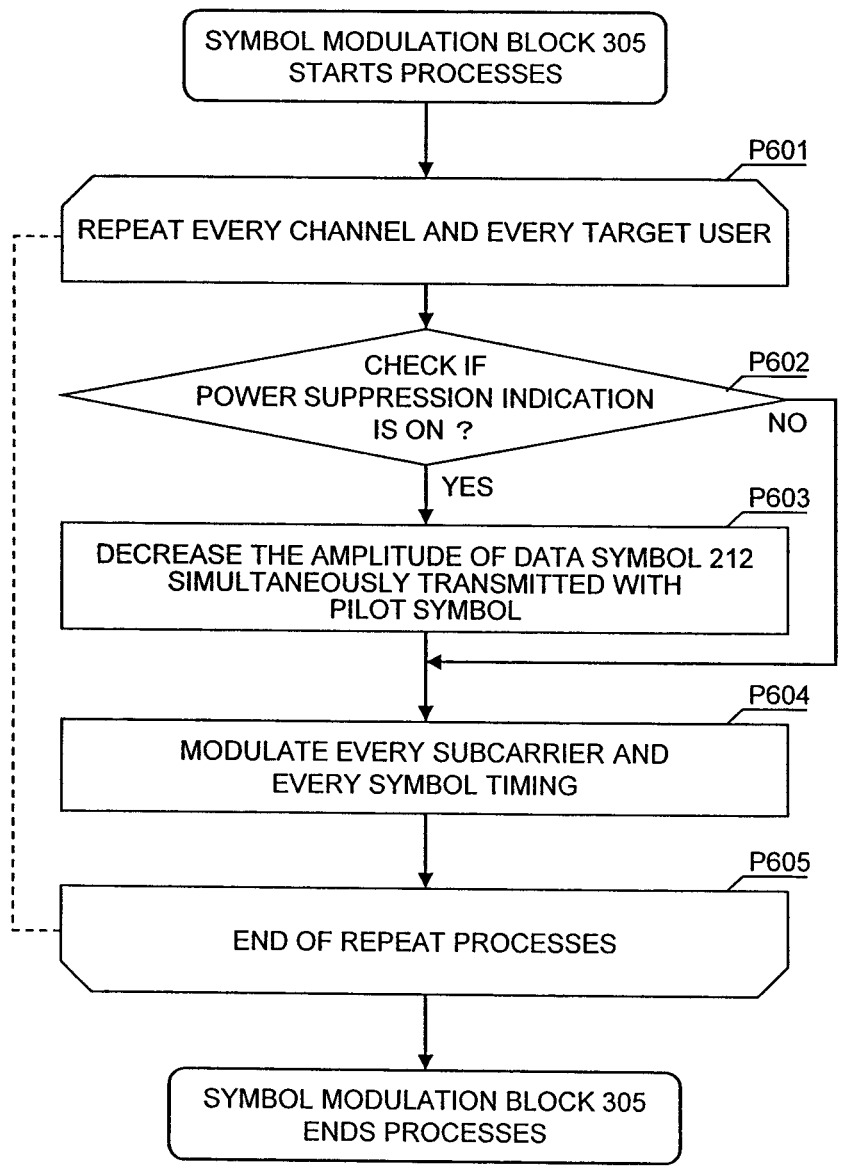
FIG. 11 is a diagram illustrating an example of a processing flow of a symbol modulation process according to the embodiment of the present invention.

FIG. 11 is an example of a processing flow of the symbol modulation block 305 according to this embodiment. The symbol modulation block 305 conducts a process of repeating a process P601 to a process P605 by the number of channels and the number of users. In the repeating process, first, as a process of deciding an interference suppression instruction in a process P602, a notice from the decision block for interference suppression 310 is decided. If the interference suppression instruction is on, the subsequent processing is advanced to a process P603, and if the interference suppression instruction is off, the subsequent processing is jumped to a process P604. In the process P603, a process of reducing the signal amplitude of the data symbols 212 simultaneously transmitted with the pilot is conducted and is advanced to the subsequent process P604. In the P604, the symbol modulation process is conducted by the aid of the modulation system such as the QPSK or the 16QAM for each subcarrier and each symbol time, and the repeating process is completed with process completion of the process P604.

The decision block for interference suppression 310 decides whether power control for interference suppression is necessary for the signals of each channel and each user, or not, and notifies the symbol modulation block 305 of the interference suppression instruction on or the interference suppression instruction off. The decision block for interference suppression 310 sets the interference suppression instruction to on if a self station is a femtocell, for example, according the type of the self station as a condition for decision. Also, the decision block for interference suppression 310 sets the interference suppression instruction to on if a destination station is a femtocell, for example, according the type of a destination station of the signal as another condition for decision. Further, the decision block for interference suppression 310 switches between a user of on and a user of off, for example, according the type of a destination user of the signal as still another condition for determination. Further, the decision block for interference suppression 310 sets the interference suppression instruction to on in a case of the best effort type communication, for example, according to QoS of the signal as still another condition for determination. Further, the decision block for interference suppression 310 sets the interference suppression instruction to on when the total transmission power of a channel is large, for example, according to the total amount of transmission power of the channel as still another condition for determination.

Figure 12:
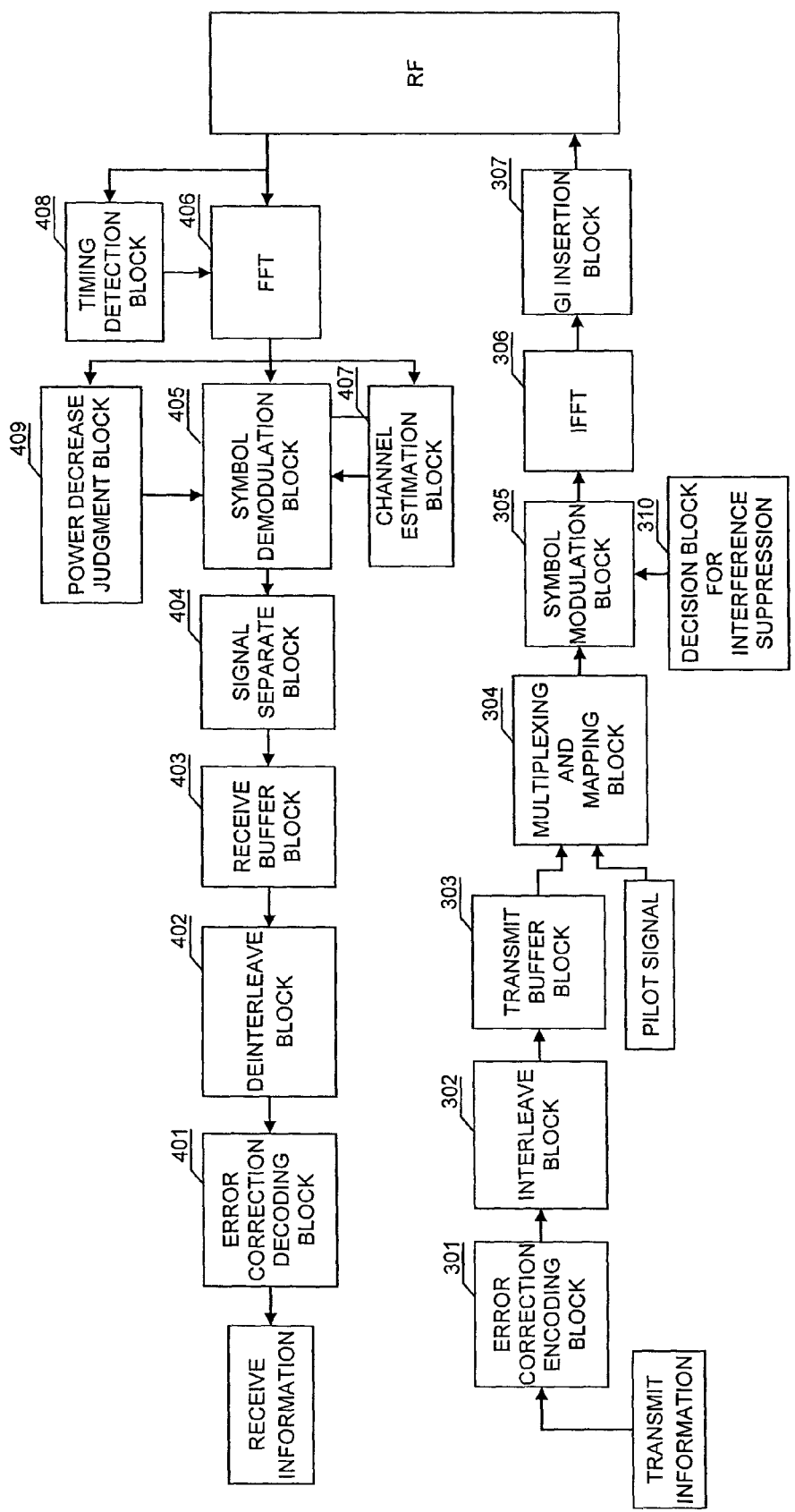
FIG. 12 is a diagram illustrating still another example of the block diagram representative of the signal processing in the radio station according to the present invention.

FIG. 12 is another example of a block diagram representative of a signal processing in a radio station according to this embodiment. A receiver station according to this embodiment can be configured as illustrated in the block diagram of FIG. 12. The block diagram of FIG. 12 is different from the block diagram of FIG. 10 in that a power decrease judgment block 409 is added, and an input from the power decrease judgment block 409 to the symbol demodulation block 405 is added. The respective blocks other than those two points conduct the operation as described with reference to the block diagram of FIG. 10.

Figure 13:
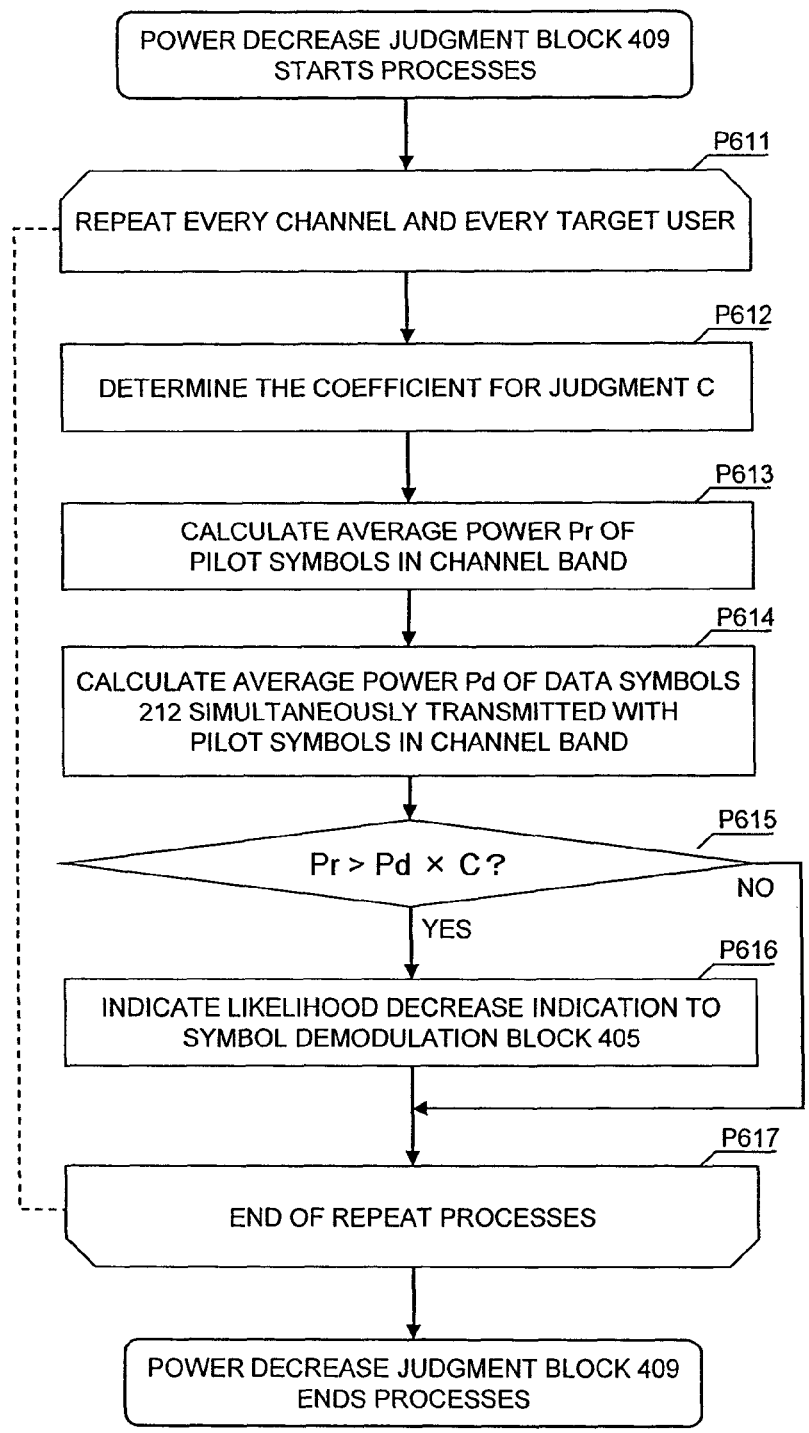
FIG. 13 is a diagram illustrating an example of a processing flow of a power decrease judgment process according to the embodiment of the present invention.

FIG. 13 is an example of a processing flow of the power decrease judgment block 409 according to this embodiment. The power decrease judgment block 409 repeats a process P611 to a process P617 by the number of channels and the number of users. In the repeating process, the power decrease judgment block 409 first determines a power decrease judgment coefficient C in a process P612. The power decrease judgment coefficient C is a nonnegative value for judging a power decrease of the data symbols 212 simultaneously transmitted with the pilot symbols at the transmitter station. A possibility that the power decrease is overlooked is decreased more as the coefficient C is smaller. On the other hand, there increases a possibility of misjudgment that the power is decreased although the power is not decreased at the transmitter station. Conversely, although the possibility of misjudgment is decreased more as the coefficient C is larger, a possibility that the power decrease is overlooked increases. As a value used as C, for example, quartered values may be fixedly used. Also, when, for example, fluctuation of the communication status is small according to the communication status, and the possibility of misjudgment is low, the coefficient C may be adaptively so changed as to select a smaller coefficient C. Then, the power decrease judgment block 409 derives an average power Pr per symbol of the pilot symbols within the channel in a process P613. In derivation of the average power Pr, the power decrease judgment block 409 may average past values. Then, the power decrease judgment block 409 derives an average power Pd per symbol of the data symbols 212 simultaneously transmitted with the pilot symbols within the channel in a process P614.

In FIG. 13, for convenience, the process P612, the process P613, and the process P614 are described in the stated order. However, because those processes are independent from each other, the processes maybe executed in any order. After the above processes, in a process P615, the power decrease judgment block 409 compares a product value of the average power Pd and the coefficient C with a value of the average value Pr. As a result of comparison, if the average power Pr is larger, the subsequent process is advanced to a process P616, and in other cases, the subsequent process is jumped to a completion of the repeating process in a process P617. In the process P616, the power decrease judgment block 409 indicates a likelihood decrease indication to the symbol demodulation block 405. The power decrease judgment block 409 completes the repeating process upon completion of the process P616 or according to a result of the branch in the process P615.

In this embodiment, when the symbol demodulation block 405 is notified of the likelihood decrease instruction from the power decrease judgment block 409, the symbol demodulation block 405 decreases the likelihood of the bits corresponding to the data symbols 212 simultaneously transmitted with the pilot symbols of an appropriate channel and user, or sets the likelihood to 0. As a process of decreasing the likelihood of the corresponding bit, there is a method in which, for example, when the symbol demodulation block 405 is not notified of the likelihood decrease instruction from the power decrease judgment block 409, the symbol demodulation block 405 multiplies the likelihood by a coefficient 1. When the symbol demodulation block 405 is not notified of the likelihood decrease instruction from the power decrease judgment block 409, the symbol demodulation block 405 multiplies the likelihood by the coefficient smaller than 1, for example, 0.5. As a process of setting the likelihood of the corresponding bits to 0, there is a method in which when the symbol demodulation block 405 is notified of the likelihood decrease instruction from the power decrease judgment block 409 likewise, the symbol demodulation block 405 multiplies the likelihood by 0.

6. Other configurations of Communication Device

In the above configuration diagrams, the respective blocks in the signal processing are described. However, actually, there is no need to provide substances independent from each other, and a general purpose processing module that realizes the operation of the respective blocks may be implemented.

Figure 9:
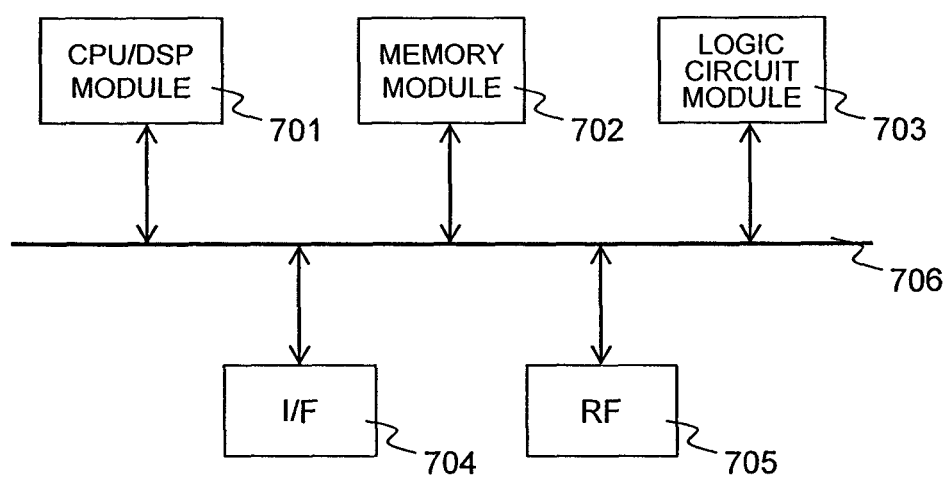
FIG. 9 is a schematic diagram of a transceiver mounted example mainly including a CPU and a DSP.

For example, FIG. 9 is a schematic diagram of a transceiver mounted example mainly including a CPU and a DSP.

A block 701 is a CPU/DSP modulate, and conducts the signal processing computation and controls the signal processing as described in the above respective embodiments. A block 702 is a memory module, and holds the transmit signal and the receive signal during the processing and before and after the processing, and a table used for the signal processing. A block 703 is a logic circuit module, and conducts the signal processing computation and controls the signal processing as described in the above respective embodiments as with the CPU/DSP 701. A block 704 is an interface module, and inputs and outputs the control signal, the transmit signal before the signal processing, and the receive signal after the signal processing. A block 705 is an RF module, which converts the transmit signal into a signal of a radio frequency bandwidth, and transmits the converted signal via an antenna, and converts the receive signal received through the antenna into a signal of the baseband bandwidth. A bus 706 connects the above respective modules to each other.

Each of the signal processing computation and the signal processing control in the respective processing blocks described in the first to fourth embodiments is conducted with the use of one or both of a program in the CPU/DSP module 701 and a computing circuit in the logic circuit module 703, and also the memory module 702 if required.

FIG. 9 illustrates a simplest embodiment having the respective modules one by one. The number of each of the module and the bus does not always need to be single. For example, plural CPU/DSP modules 701 may be provided, or plural buses 706 may be provided. Also, when the plural buses 706 are provided, there is no need to always connect all the buses to all the modules. For example, there may be provided one bus connected to all the modules, and another bus connected to only the memory module 702 and the logic circuit module 703.

INDUSTRIAL APPLICABILITY

The present invention can be applied to various multicarrier communication systems and modulation systems other than the above-mentioned systems and methods.

The invention claimed is:

1. A signal mapping method for mapping data signals and pilot signals having a known pattern in each symbol determined by a subcarrier number and a symbol number, or in each symbol determined by a frequency axis and a time axis, in a multicarrier communication system that communicates an encoded signal by using a plurality of subcarriers, the signal mapping method comprising steps of:
   subjecting a transmit signal of N0 bits to error correction encoding to generate a signal of N1 bits; and
   when signals that can be mapped in a plurality of first data symbols not simultaneously transmitted with the pilot symbols are M0 bits, and signals that can be mapped in a plurality of second data symbols simultaneously transmitted with the pilot symbols are M1 bits,
   (i) in a case of $N0 \leq M0 \leq N1$,
   extracting M0 bits minimumly required for decoding the transmit signal of N0 bits before the error correction encoding, from the signals N1 bits after the error correction encoding to configure punctured codes of an encoding ratio N0/M0, mapping the punctured codes in the plurality of first data symbols, and also mapping a part or all of bits of the signals that are not mapped in the plurality of first data symbols among the signals after the error correction encoding, in the plurality of second data symbols,
   (ii) in a case of $M0 > N1$,
   mapping all of the signals N1 bits after the error correction encoding in the plurality of first data symbols,
   (iii) in a case of $M0 < N0 \leq M0+M1$,
   configuring the codes of the encoding ratio N0/(M0+M1) from the signals N1 bits after the error correction encoding, and mapping the codes in the plurality of first data symbols and the plurality of second data symbols.

2. The signal mapping method according to claim 1, comprising:
   i-1) in a case of $N0 \leq M0 \leq N1$ and $M0+M1 \leq N1$,
   discarding signals that are not mapped in the plurality of first data symbols and the plurality of second data symbols among the signals N1 bits after the error correction encoding as they are, or preferentially selecting and/or storing the signals not mapped as information used for retransmission; and
   i-2) in a case of $N0 \leq M0 \leq N1$ and $M0+M1 > N1$,
   further selecting signals for M0+M1−N1 bits from the signals already mapped in any one of the plurality of first data symbols and the plurality of second data symbols, and mapping the selected signals in the plurality of second data symbols.

3. The signal mapping method according to claim 1, comprising:
   (ii) in a case of $M0 > N1$,
   further selecting signals for M0−N1 bits from the signals already mapped in the plurality of first data symbols and mapping the selected signals in the plurality of first data symbols, and selecting the signals for M1 bits and mapping the selected signals in the plurality of data symbols.

4. The signal mapping method according to claim 1, comprising:
(iv) in a case of M0+M1<N0,
when the signal can be received in transmission of x units (x≤2), treating the number of bits that can be mapped in the plurality of first data symbols for the x units together as M0, treating the number of bits that can be mapped in the plurality of second data symbols for the x units together as M1, and mapping the signal by applying any one of the cases (i), (ii), and (iii).

5. The signal mapping method according to claim 1, further comprising:
mapping the plurality of no transmission symbols transmitting no signal on the matrix; and
treating the plurality of third data symbols simultaneously transmitted with the plurality of no transmission symbols as the plurality of second data symbols, or as the plurality of first data symbols.

6. The signal mapping method according to claim 1,
wherein a maximum number of transmission bits transmittable per one symbol of a modulation system used in a data symbol simultaneously transmitted with the pilot signals is made smaller than a maximum number of transmission bits transmittable per one symbol of the modulation system used in the data symbol not simultaneously transmitted with the pilot symbols.

7. The signal mapping method according to claim 1,
wherein a modulation system having information in an amplitude direction and a phase direction is used in data symbols not simultaneously transmitted with the pilot signals, and
a modulation system having information only in the phase direction without information in the amplitude direction is used in the data symbols simultaneously transmitted with the pilot signals.

8. The signal mapping method according to claim 1,
wherein a transmission power or an amplitude of the second data symbols is made smaller than a transmission power or an amplitude of the first data symbols, or the transmission power or the amplitude of the second data symbols is set to 0.

9. The signal mapping method according to claim 8,
wherein a signal amplitude of the plurality of second data symbols is decreased or set to 0 according to an interference suppression instruction indicating that a power control for interference suppression is necessary.

10. The signal mapping method according to claim 8,
wherein a likelihood obtained as a result of demodulating the plurality of second data symbols is decreased or set to 0.

11. The signal mapping method according to claim 8,
wherein a power of the pilot symbols is compared with a power of the second data symbols, a likelihood decrease indication is indicated according to a comparison result, and in a symbol decoding process, the likelihood of bits corresponding to the second data symbols of appropriate channel and/or user is decreased or set to 0 according to the likelihood decrease indication.

12. The signal mapping method according to claim 11,
when a power decrease judgment coefficient C is a given coefficient that is a nonnegative value for judging a power decrease of the plurality of second data symbols at a transmitter station, an average power Pr is an average power per symbol of the pilot symbols within the channel, and an average power Pd is an average power per symbol of the plurality of second data symbols within the channel,
a product value of the average power Pd and the predetermined power decrease judgment coefficient C are compared with a value of the average power Pr, and, when the average power Pr is larger in the result of comparison, the likelihood decrease indication is indicated.

* * * * *